United States Patent

[11] 3,612,180

| [72] | Inventors | Edwin A. Richardson<br>Houston, Tex.;<br>Leo P. Broussard, New Orleans, La. |
|------|-----------|---------------------------------|
| [21] | Appl. No. | 852,936 |
| [22] | Filed | Aug. 25, 1969 |
| [45] | Patented | Oct. 12, 1971 |
| [73] | Assignee | Shell Oil Company<br>New York, N.Y. |

[54] SELECTIVE ZONE CONSOLIDATION OF INCOMPETENT FORMATIONS BY METALLIZATION
1 Claim, No Drawings

[52] U.S. Cl. ............................................. 166/292, 166/300
[51] Int. Cl. ............................................. E21b 33/138
[50] Field of Search ............................... 166/292, 295, 300; 106/1

[56] References Cited
UNITED STATES PATENTS

| 1,207,218 | 12/1916 | Roux ........................... | 106/1 X |
| 3,294,168 | 12/1966 | Bezemer et al. ............... | 166/295 |
| 3,385,363 | 5/1968 | Hamby et al. .................. | 166/300 |
| 3,393,737 | 7/1968 | Richardson ................... | 166/300 X |
| 3,439,744 | 4/1969 | Bradley ........................ | 166/295 X |

*Primary Examiner*—Ian A. Calvert
*Attorneys*—J. H. McCarthy and Geroge G. Pritzker

ABSTRACT: A method of consolidating an incompetent heterogeneous earth formation by selectively isolating or plugging off certain zones, e.g., nonproductive zones of said formation, and thereafter consolidating the oil-producing zones with an electroless metal-plating solution.

SELECTIVE ZONE CONSOLIDATION OF INCOMPETENT FORMATIONS BY METALLIZATION

BACKGROUND OF THE INVENTION

In U.S. Pat. Nos. 3,393,737; 3,438,440 and 3,438,441 and pending U.S. application Ser. No. 692,726, filed Dec. 27, 1967, now Pat. No. 3,500,926, and Ser. No. 705,907, filed Feb. 16, 1968, now U.S. Pat. No. 3,509,927, electroless metal-plating techniques are described for consolidating unconsolidated formations. It is disclosed that the process may be superior to resin consolidated techniques for consolidating earth formations as described in such papers as the Journal of Petroleum Technology, May, 1966, p. 545, entitled "Review of Sand Consolidation Experience in Southern Louisiana" by J. L. Rike, or the Journal of Petroleum Technology, Dec., 1961, paper entitled "Large-Scale Laboratory Investigation of Sand Consolidation Techniques" by W. F. Hoover, or the Journal of Petroleum Technology, Dec., 1966, p. 1,537, article entitled "Studies of a New Process to Consolidate Oil Sands with Plastics" by B. R. Treadway or as described in U.S. Pat. Nos. 3,412,796; 3,419,072; 3,378,071; 3,373,813; 3,310,111; 3,282,338 and the like. Disadvantages common in such resin consolidation processes for consolidating incompetent formations may include the following; rigs are required, curing time is difficult to control, and the resin coating or binding material is not resistant to temperature changes encountered in the treated formation or to water stability or the influence of corrosive acids and the like. This results in costly operations of limited use or benefit and, therefore, makes the electroless metal consolidation techniques described in the above-mentioned references more attractive since metal plating consolidations require no rig, the formations thus treated are not effected by temperature changes and are water stable and exhibit a high-compressive strength.

SUMMARY OF THE INVENTION

It has now been discovered that the electroless metal plating consolidation process made reference to in the above-mentioned art can be successfully utilized in heterogeneous formations containing thief zones or highly permeable zones or nonproductive zones and/or unconsolidated zones by isolating and/or plugging said zones permanently or temporarily and thereafter electrolessly metal plating the oil productive unconsolidated zones so as to consolidate said zones and finally effectively and efficiently producing oil therefrom by any suitable means, such as by miscible and/or immiscible driving fluids which can include hydrocarbon fluids, e.g., propane, $CO_2$, $H_2S$ and mixtures thereof, or water, steam or mixtures thereof and to which fluids can be added thickeners, surfactants and the like.

The plugging techniques included chemical-plugging materials which tend to gel, consolidate or the like as described in U.S. Pat. Nos. 3,439,744 or 3,415,318, or 3,435,899 or 3,443,640 and the like or by mechanical means of isolating certain zones of a formation such as described in copending U.S. application Ser. No. 752,106, filed Aug. 9, 1968(now U.S. Pat. No. 3,527,302), or as described in U.S. Pat. Nos. 2,986,214; 3,270,814; 3,273,647; 3,430,701 or 3,447,607 and the like. A particularly preferred method of treating formations under discussion is to complete the well borehole by the method described in copending U.S. application Ser. No. 752,106 (Pat. 3,527,302) which comprises:

completing a cased well extending into a hydrocarbon-bearing subterranean formation comprising the steps of:

setting a permanent indexer at a fixed position below a producing interval in said formation;

perforating said well casing adjacent said producing interval in a predetermined pattern thereby forming a plurality of levels or perforations in a pattern communicating with said interval;

extending a straddle-packing device having aperture means therein into a position within said well straddling the perforations in a manner sealing off one perforated level of casing from the other while aligning the aperture means with each of said patterned levels of perforations; and moving aperture sealing means via a tubing string having at least one opening therein axially within said well to a position aligning the opening with one level of said perforations while sealing off the remaining axially displaced perforations.

AN EMBODIMENT OF THE INVENTION

The process of the present invention in outline form comprises:

1. extending a fluid conduit through a well borehole from a surface location, in sequence, to each of a series of depths that are each adjacent to a selected layer of unconsolidated subsurface earth formation;

2. temporarily plugging the borehole above and below each selected depth so that, in each instance, fluid flowed through the conduit can enter only the adjacent selected layer of earth formation;

3. increasing the fluid pressure in the conduit to a pressure exceeding that in each selected layer;

4. injecting at least one slug of electroless metal-plating solution into each layer adjacent to a selected depth so that fluid enters the surrounding earth formation under conditions adapted to consolidate an earth formation by metal plating;

5. reducing the pressure in the conduit and backflowing fluid from each earth formation into which metal-plating solution has been injected; and, 6. sealing off the fluid communication between the borehole and each unconsolidated earth formation from which the production of said during the backflowing of fluid is not substantially terminated by the consolidation effect of the injected electroless metal-plating solution.

Once the undesirable zones of the heterogeneous unconsolidated formation have been isolated and plugged, if necessary, the oil-producing zones can be effectively consolidated by electroless metal process and the technique to be utilized depends upon the depth and temperature of the formation. Thus, for shallow, low-temperature conditions the process and chemical formulation described in U.S. Pat. No. 3,438,441 can be used and for deep, high-temperature conditions the process and formulation described in U.S. Pat. No. 3,438,440 can be used and for general use the process and formulation described in U.S. Pat. No. 3,393,737 can be used. Also where extreme high-compressive strength in consolidating formations is required, the process and formations described in copending U.S. application Ser. No. 850,253, filed Aug. 14, 1969 or Ser. No. 840,826 filed July 10, 1969 or Ser. No. 849,178, filed Aug. 11, 1969 are applicable. A most desired general metal-plating technique is also described in copending U.S. application Ser. No. 850,253, filed Aug. 14, 1969 wherein a backflush technique is used in order to get greater depth of consolidation and high-compressive strength.

PREFERRED EMBODIMENT OF THE INVENTION

The preferred method of completing the well and consolidating selective zones of heterogeneous formations by the electroless metal-plating techniques comprises first isolating the desired zones to be consolidated by utilizing the mechanical means described in copending U.S. application Ser. No. 752,106, filed Aug. 9, 1968, and thereafter metal consolidating the selected zones by the backflow metal-plating technique as described in copending U.S. application Ser. No. 850,253, filed Aug. 14, 1969. Thus, a well can be completed by the method described in copending U.S. application Ser. No. 752,106 (Pat. 3,527,302) by extending a well casing into a formation in which only certain zones are to be metal plated and consolidated by setting a permanent indication at a fixed distance below a producing zone in a formation and perforating the well casing at various levels in a predetermined pattern adjacent to the producing zone. A straddle-packing device having aperture means therein is extended into the well to a position straddling the level of perforations in a manner sealing off one level of the perforation from the others while aligning the aperture means with each level of the patterned perforations. The aperture-sealing means having at least one opening therein is moved via a tubing string axially within the well to a position aligning the opening with one level of the perforations while sealing off the remaining axially displaced perforations. Thus, by this method an efficient well-completion technique for mechanically isolating and later retreating individual perforations in a single or dual completions through a production packer assembly is accomplished and allows thereafter for consolidating only those sections of the production zones which are best receptive to metal consolidation. This technique is outlined as follows:

1. After logging, a permanent packer (indexer) is set at a fixed distance below the interval to be perforated.
2. The producing interval is pattern perforated using the permanent packers as an indicator.
3. Straddle packer equipment is located straddling each perforation packer with a selective-positioning device extending through the permanent packer.
4. Individual perforations are selectively tested and treated by moving the treating seal assembly in the selective-positioning device below the straddle packer.
5. Individual perforations are selectively treated and those that fail to accept treatment are isolated by inserting a blank selection(s) of production seal assembly opposite the untreated perforation(s) and thereafter the perforations in the production zone which accept treatment are subjected to the electroless metal-plating process of the present invention.

The electroless metal-plating process for consolidating formations in general comprises treating the selected production zones of said formations with an activator solution, followed by a metal-plating solution containing a reducing agent and if desired activators, buffering agents, etc.

The activator solutions can be any of the activator solutions described in U.S. Pat. Nos. 3,393,737; 3,438,440 or 3,438,441 and include stannous chloride and/or palladium chloride solutions which may contain hydrazine and which solutions can be buffered with weak organic acids such as formic or acetic acids and their salts. Preferred activator solutions are shown in Table 1.

TABLE 1

| Composition of activator solution ($A_1$) | Quantity per barrel of solution [1] |
|---|---|
| Water | 40.7 gallons. |
| Gum arabic [2] | 20.6 gms. |
| Hydrazine hydrate (85%) | 256 cc. (or 400 cc. of 35% hydrazine). |
| Palladium chloride solution [3] | 636 cc. |
| Omit when buffers are used: | |
| $NiSO_4 \cdot 6H_2O$ | 3.5 pounds. |
| 90% formic acid or glacial acetic (as needed for pH=4.4) | ~160-320 cc. |
| Buffers: | |
| Formic acid (90%) | 640 cc. |
| Sodium formate | 7 pounds. |
| or | |
| Acetic acid (glacial) | 6.4 liters. |
| Sodium acetate | 10.5 pounds. |

[1] Contains 10.2 grams $PdCl_2$/bbl. of activator solution.
[2] Requires about 15 minutes to dissolve.
[3] Contains 1.6 gms. $PdCl_2$, 10 cc. conc. HCl, 90 cc. distilled or deionized water/100 cc. $PdCl_2$ solution.

NOTE: Chemicals must be added to the water in the order listed with complete mixing and dissolving before adding the next chemical.

The metal-plating solution can be those described in U.S. Pat. Nos. 3,393,737; 3,438,440 or 3,438,441 and include nickel or copper or cobalt-plating solutions containing as the reducing agents sodium hypophosphite or the like. In a preferred metal-plating solution for consolidating incompetent formations at relatively high temperatures, the metal deposition is accomplished by the reduction of a nickel complex by oxidation of phosphite ions, such as $(HPO_3)^{=}$, to phosphate ions, such as $(PO_4)^{\equiv}$. Reduction of the nickel compound to nickel as the metalizing or bonding agent for the sand grains of an incompetent formation in the presence of a phosphite ion-containing compound results in better reaction control at temperatures of from about 250° to 400° F. and the compressive strength of the consolidated mass can be in the order of 20,000 to over 40,000 p.s.i.

A preferred technique for metal consolidating selected zones of incompetent formations include that described in copending U.S. application Ser. No. 850,253, filed Aug. 14, 1969 and comprises:

1. pumping through the conduit and into the earth formation an amount of activated electroless metal-plating solution that is sufficient to place metal on any unconsolidated grains in the portion of the earth formation that is first contacted by fluid flowing from the conduit to the formation and consolidate those grains into an integral permeable mass but is insufficient to cause more than a selected degree of reduction in the permeability of the first contacted portion of the earth formation;
2. backflowing fluid from the earth formation into a portion of the well in which solids entrained by the backflowed fluid are at least to some extent removed from the flow path of fluid flowing from the conduit to the earth formation; and
3. pumping at least one additional portion of activated electroless metal-plating solution through the conduit and into the earth formation.

In the above definition, the term "activated metal-plating solution" refers to a solution of electroless metal-plating components in contact with activating components. Such a solution is preferably formed in situ by pretreating the rock with a solution of activating components. However, a solution of some or all of the activating components can be mixed with a solution of some or all of the plating components prior to the injection into the earth formation.

A notable feature of the present invention is that it offers a new and economic method of consolidating selective zones of incompetent formations which greatly aid in oil recovery and production efficiency. Also, the process of the present invention by the metallization process protects all metal equipment coming in contact with the metal-plating solution from corrosion, wear and the like.

We claim as our invention:

1. A process for consolidating selected unconsolidated portions of a subterranean reservoir, comprising:
   extending a fluid conduit from a surface location through a well borehole, in sequence, to depths adjacent to the depths of selected unconsolidated layers within a subterranean reservoir;
   at each of said depths, temporarily plugging the borehole above and below the depth of the selected layer, to cause fluid injected through said conduit to enter only the selected layer;
   at each of said depths, increasing the pressure of fluid in said conduit to a pressure exceeding that of fluid in said selected layer;
   at depths at which said pressure increase causes fluid to enter the adjacent layer of the reservoir, injecting at least one solution containing activating and plating components for effecting an electroless metal-plating consolidation of an unconsolidated earth formation;
   at depths at which said metal-plating components have been injected, producing fluid from the reservoir by reducing the pressure within said conduit to a pressure below that of fluid in the adjacent layer of the reservoir; and
   sealing off the fluid communication between the borehole and the adjacent portion of the reservoir at depths adjacent to those of said selected unconsolidated layers from which the inflowing of sand entrained in fluid produced from the reservoir is not prevented by the consolidating action of said metal-plating components.